US008688993B2

United States Patent
Baum et al.

(10) Patent No.: US 8,688,993 B2
(45) Date of Patent: Apr. 1, 2014

(54) METHOD AND APPARATUS FOR DETERMINING AND USING THE SAMPLING FREQUENCY FOR DECODING WATERMARK INFORMATION EMBEDDED IN A RECEIVED SIGNAL SAMPLED WITH AN ORIGINAL SAMPLING FREQUENCY AT ENCODER SIDE

(75) Inventors: Peter Georg Baum, Hannover (DE); Walter Voessing, Hannover (DE); Ulrich Gries, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 905 days.

(21) Appl. No.: 12/319,302

(22) Filed: Jan. 6, 2009

(65) Prior Publication Data
US 2009/0193255 A1 Jul. 30, 2009

(30) Foreign Application Priority Data

Jan. 24, 2008 (EP) .................................... 08100898

(51) Int. Cl.
H04L 29/06 (2006.01)
H04L 9/32 (2006.01)
H04N 7/167 (2011.01)
H03M 1/06 (2006.01)

(52) U.S. Cl.
CPC ................ H04L 9/32 (2013.01); H04L 9/3247 (2013.01); H04N 7/167 (2013.01); H03M 1/0617 (2013.01)
USPC ........... 713/176; 713/168; 380/220; 380/238; 375/240

(58) Field of Classification Search
CPC ........ H04L 9/32; H04L 9/3247; H04N 7/167; H03M 1/0617
USPC ............ 713/168, 176; 380/220, 238; 375/240
See application file for complete search history.

(56) References Cited

U.S. PATENT DOCUMENTS

| | | | | |
|---|---|---|---|---|
| 5,796,757 | A | * | 8/1998 | Czaja ............................ 714/789 |
| 6,052,406 | A | * | 4/2000 | Epstein et al. ................ 375/134 |

(Continued)

FOREIGN PATENT DOCUMENTS

| | | |
|---|---|---|
| EP | 1764780 A1 | 3/2007 |
| JP | 2004023183 | 1/2004 |

(Continued)

OTHER PUBLICATIONS

Search report dated Jul. 9, 2008.

*Primary Examiner* — Cordelia Zecher
*Assistant Examiner* — Sarah Su
(74) *Attorney, Agent, or Firm* — Myers Wolin LLC

(57) ABSTRACT

In watermarked signal decoding, the embedded message is decoded by correlating the reference patterns with the watermarked signal. The watermark detector decides, depending on the size of the correlation result values, whether or not a given reference pattern was embedded. However, decoding watermarked audio or video signals is difficult if the link between the watermark encoder and the watermark decoder is not a digital one, for example an acoustic path. A re-sampler control unit controls the sampling frequency of a re-sampler, in connection with a watermark decoder that outputs, in addition to the watermark information bits, a corresponding confidence value that is derived from the correlation result and that is used for synchronizing the re-sampler sampling frequency with the original sampling frequency of the watermarked signal. The synchronization processing includes a search mode and a synchronized mode.

9 Claims, 1 Drawing Sheet

(56) References Cited

U.S. PATENT DOCUMENTS

| | | | |
|---|---|---|---|
| 6,061,793 A | 5/2000 | Tewfik et al. | |
| 6,112,325 A * | 8/2000 | Burshtein | 714/774 |
| 6,208,695 B1 * | 3/2001 | Klank et al. | 375/260 |
| 6,584,138 B1 | 6/2003 | Neubauer et al. | |
| 6,810,078 B2 * | 10/2004 | Bradley | 375/225 |
| 6,901,546 B2 * | 5/2005 | Chu et al. | 714/738 |
| 7,945,004 B2 * | 5/2011 | Storm et al. | 375/344 |
| 8,041,073 B2 * | 10/2011 | Baum et al. | 382/100 |
| 8,050,452 B2 * | 11/2011 | Bradley et al. | 382/100 |
| 2002/0108090 A1 * | 8/2002 | Ariel et al. | 714/792 |
| 2009/0187765 A1 * | 7/2009 | Baum et al. | 713/176 |
| 2009/0235079 A1 * | 9/2009 | Baum et al. | 713/176 |
| 2011/0103444 A1 * | 5/2011 | Baum et al. | 375/224 |
| 2013/0073296 A1 * | 3/2013 | Bayer et al. | 704/500 |

FOREIGN PATENT DOCUMENTS

| | | |
|---|---|---|
| JP | 2005109918 | 4/2005 |
| JP | 2007180999 | 7/2007 |
| WO | WO 00/63786 A | 10/2000 |

* cited by examiner

METHOD AND APPARATUS FOR DETERMINING AND USING THE SAMPLING FREQUENCY FOR DECODING WATERMARK INFORMATION EMBEDDED IN A RECEIVED SIGNAL SAMPLED WITH AN ORIGINAL SAMPLING FREQUENCY AT ENCODER SIDE

This application claims the benefit, under 35 U.S.C. §119, of European Patent Application No. 08100898.9 of 24 Jan. 2008.

FIELD OF THE INVENTION

The invention relates to a method and to an apparatus for determining and using at decoder side the sampling frequency for decoding watermark information embedded in a received signal sampled with an original sampling frequency at encoder side.

BACKGROUND OF THE INVENTION

A watermark in an audio or video signal can be detected at receiving or decoder side using correlation, as described for example in WO 2007/031423, WO 97/33391 (U.S. Pat. No. 6,584,138 B1) or U.S. Pat. No. 6,061,793.

Many watermarking systems make use of correlation for calculating a detection metric, which means that several pseudo-random sequences or reference patterns are generated, or read from a memory, at encoder side and one or more of them are embedded inside the content (e.g. an audio or video signal), dependent on the message to be embedded. Normally, the reference patterns are orthogonal to each other. The same pseudo-random sequences are generated, or read from a memory, at decoder side. Frequency transform may be used to en-ode and decode the embedded message. To decode the embedded message, it is necessary to discover which pseudo-random sequence or sequences were embedded at encoder side. This is determined in these systems by correlating the known pseudo-random sequences with the possibly watermarked content, whereby the correlation may operate on a pre-processed version of the content, and that pre-processing may include inverse frequency transform, spectral shaping and/or whitening.

Each embedded reference pattern may represent a single bit of the embedded message, or two or more bits. A watermark detector decides, depending on the size of the correlation result values, whether or not a given pseudo-random sequence was embedded.

SUMMARY OF THE INVENTION

However, receiving watermarked audio or video signals and watermark decoding them is difficult if the link between the watermark encoder and the watermark decoder is not a digital one. In such case, for example when there is an 'acoustic path' in which the watermarked signal comes out of a loudspeaker and a microphone is used for receiving the watermarked signal, the sampling frequencies at encoder side and at decoder side are not the same. At least one D/A converter and one A/D converter operating with likely slightly different sample frequencies are used. An acoustic path may be used in a program audience measurement application with fixed or mobile watermarking detection, or may be used illegally by recording pirates in a cinema. Normally, the quality of such acoustic path varies over time.

A problem to be solved by the invention is to determine the correct sampling frequency for decoding the watermark information that is embedded in a received distorted signal.

According to the invention, a re-sampler control unit controls the sampling frequency of a re-sampler, in connection with an audio watermark decoder. That watermark decoder outputs, in addition to the watermark information bits, a corresponding confidence value that is derived from a correlation result and that is used in the re-sampler control unit for synchronizing the re-sampler sampling frequency with the original sampling frequency of the incoming watermarked audio signal. The synchronization processing includes a 'search mode' and a 'normal (i.e. synchronized) mode'. An advantage of the invention is that it facilitates decoding of watermarked signals starting with initially non-synchronized sampling frequencies.

In principle, the inventive method is suited for determining and using a sampling frequency for decoding watermark information embedded in a received signal sampled with an original sampling frequency at encoder side, said decoding including correlation with at least one reference pattern, said method including the steps:

in a search mode,
for successive sections or frames of said received signal, scanning repeatedly candidate sampling frequencies within a frequency range that includes said original sampling frequency, thereby watermark decoding, using these candidate sampling frequencies, the corresponding section or frame of said received signal,
wherein for each candidate sampling frequency used in said watermark decoding a corresponding watermark bit confidence value derived from said correlation is determined and the confidence values for each one of the candidate sampling frequencies are summed up or combined,
and wherein, as soon as the confidence value of a current candidate sampling frequency is greater equal a first threshold value, said search mode is left and a normal mode is entered with this candidate sampling frequency being selected;
determining the maximum and the second maximum one of the confidence sum values wherein, as soon as their quotient or their difference exceeds a second threshold value, or in case a maximum scanning loop number is achieved, said search mode is left and said normal mode is entered upon selecting the candidate sampling frequency that is related to said maximum confidence sum value, or in case said maximum scanning loop number is achieved it is calculated whether said quotient or said difference exceeds said second threshold value and if not true said search mode is continued;
in the normal or synchronized mode, taking said selected candidate sampling frequency as said original sampling frequency and watermark decoding said received signal section by section or frame by frame using said selected candidate sampling frequency.

In principle the inventive apparatus is suited for determining and using a sampling frequency for decoding watermark information embedded in a received signal sampled with an original sampling frequency at encoder side, said decoding including correlation with at least one reference pattern, said apparatus including means being adapted for:
in a search mode,
for successive sections or frames of said received signal, scanning repeatedly candidate sampling frequencies within a frequency range that includes said original sampling frequency, thereby watermark decoding, using these candidate sampling frequencies, the corresponding section or frame of said received signal,
wherein for each candidate sampling frequency used in said watermark decoding a corresponding watermark bit confidence value derived from said correlation is determined and the confidence values for each one of the candidate sampling frequencies are summed up or combined,
and wherein, as soon as the confidence value of a current candidate sampling frequency is greater equal a first threshold value, said search mode is left and a normal mode is entered with this candidate sampling frequency being selected;
determining the maximum and the second maximum one of the confidence sum values wherein, as soon as their quotient or their difference exceeds a second threshold value, or in case a maximum scanning loop number is achieved, said search mode is left and said normal mode is entered upon selecting the candidate sampling frequency that is related to said maximum confidence sum value, or in case said maximum scanning loop number is achieved it is calculated whether said quotient or said difference exceeds said second threshold value and if not true said search mode is continued;
in the normal or synchronized mode, taking said selected candidate sampling frequency as said original sampling frequency and watermark decoding said received signal section by section or frame by frame using said selected candidate sampling frequency.

BRIEF DESCRIPTION OF THE DRAWINGS

Exemplary embodiments of the invention are described with reference to the accompanying drawings, which show in.

DETAILED DESCRIPTION OF PREFERRED EMBODIMENTS

Most watermarking systems use a correlation based detection, which means that at encoder side several pseudo-random sequences representing a bit or word value are generated, or selected from a memory, and one or more of them are embedded inside the content or signal (e.g. an audio or video signal), depending on the message (e.g. watermark bits) to be embedded. The same pseudo-random sequences are generated, or selected from a memory, at decoder side. To decode the embedded message, it is necessary to determine which pseudo-random sequences were embedded inside the received content or signal. This is performed e.g. by correlating the known pseudo-random sequences with the possibly pre-processed content or signal. The decoder or receiver detector thereafter decides, depending e.g. on the size of the correlation result amplitude values, whether or not a given sequence was embedded.

Figure 1:
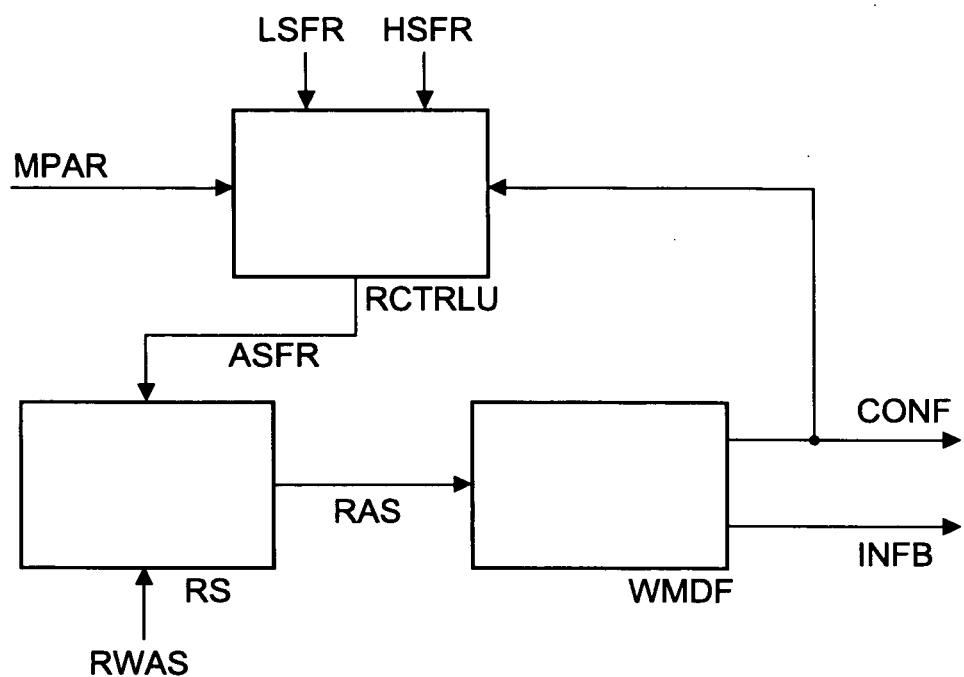
FIG. 1 basic block diagram for the inventive re-sampling steps or stages.

In FIG. 1, for detecting the correct sampling frequency of the incoming watermarked signal RWAS, a watermark decoder or decoder function WMDF is used which receives a re-sampled audio signal RAS and provides as outputs (e.g.) one bit of the watermark information INFB at a time and a corresponding 'confidence value' CONF, which belongs to this decoded bit INFB. The confidence value CONF is high if the value of the information bit is credible, and is low if the value of the information bit is unreliable. Upstream the decoder WMDF a re-sampler RS is arranged, which receives the incoming watermarked signal RWAS and from a re-sampler control unit RCTRLU the actual sampling frequency ASFR.

The re-sampler control unit RCTRLU receives the confidence values CONF, a low sampling frequency (value) LSFR and a high sampling frequency (value) HSFR defining a frequency range that is explained below, and more parameters MPAR like a first threshold value for confidence, a second threshold value for a maximum number of frequency range checks, a third threshold value regarding maximum and second maximum confidence sum values, number of gliding confidence values that are to be summed up in a normal mode, a fourth threshold value regarding a current confidence sum value, number of possible candidate frequencies or their spacing.

If a confidence value CONF is low, the acoustic path can be distorted at the corresponding time instant, or the correlation result value is low at the current candidate sampling frequency (i.e. no clear peak can be determined in the correlation result), or both. There is no way to find out the true reason or reasons for a current low confidence value CONF.

The synchronization processing is carried out in two different modes:

Starting with 'Search Mode'

A sampling frequency range (e.g. ±1%) is predefined, which means that for an expected or candidate sampling frequency of e.g. 48000 Hz the start frequency LSFR for searching is 47520 Hz and the stop frequency HSFR is 48480 Hz. This range from start frequency to stop frequency is divided into a number of test frequencies, e.g. 40 frequencies. The spacing of these frequencies is critical: if the difference between two adjacent candidate frequencies is too big, the re-sampler cannot synchronize, and if the difference between two adjacent candidate frequencies is too small, the number of test frequencies increases so that the search time becomes too long.

For checking candidate frequencies, different searching approaches can be used: for instance, beginning with the lowest test frequency, beginning with the highest test frequency, beginning in the middle of the frequency range and proceeding therefrom to one side or either side.

For each candidate sampling frequency ASFR output from the re-sampler control unit RCTRLU, the re-sampler RS is called and then the watermark decoder function WMDF. The related confidence value CONF from the watermark decoder is saved in RCTRLU. In case a confidence value CONF is smaller than a predetermined first threshold value, the next candidate sampling frequency is tested, until the whole frequency range is checked. Thereafter, based on the following frame of the received signal RWAS, the frequency range is searched or checked or scanned again for a suitable sampling frequency. This kind of processing is repeated up to e.g. 50 times (i.e. a second threshold value), so that each candidate frequency is checked several times at different time instants. In case a confidence value CONF is equal to or exceeds the first threshold value, the actual candidate sampling frequency ASFR is assumed to be the correct sampling frequency and the search mode is stopped and the 'normal (synchronized) mode' processing is entered.

For each candidate frequency the corresponding confidence values from the up to e.g. 50 loops are summed up or are combined. The maximum one and the second maximum one of the corresponding confidence sum values are determined. As soon as the quotient of these both sum values exceeds a third threshold value, or as soon as e.g. the difference between both sums exceeds the third threshold value, the search processing can be stopped and the candidate sampling frequency corresponding to the maximum confidence sum value is selected for the 'normal (synchronized) mode' processing.

Otherwise, the search processing continues until the maximum loop number is reached or until a confidence value CONF equal to or exceeding the first threshold value is found, followed by entering the normal mode.

As an alternative, as soon as the maximum scanning loop number is achieved it is calculated whether the quotient or the difference exceeds the third threshold value, and if not true the search mode is continued.

The storage and calculation operations are carried out in re-sampler control unit RCTRLU.

Continuing with 'Normal (Synchronized) Mode'

In normal mode, the selected sampling frequency that has been determined within the search mode is used as sampling frequency ASFR for re-sampler RS.

As an option, a predefined number of adjacent sampling frequencies below and above this preliminarily selected sampling frequency is tested (from time to time or continuously in order to take into account small changes of the sampling frequency of the incoming audio signal RWAS caused by thermal effects or a 'Doppler effect' (caused by non-fixed distance between loudspeaker and microphone). The spacing between the tested candidate frequencies can be different than in the search mode and can be decreased over time in order to determine the correct sampling frequency as precise as possible.

While in normal mode, a predetermined number of the latest corresponding confidence values CONF output from WMDF together with the watermark information bits INFB is continuously summed-up, i.e. the current maximum confidence sum value is monitored, to recognize a significant change in the correct sampling frequency. That predetermined number can be different than the maximum loop number mentioned in the search mode section. If the current confidence sum value is smaller than a fourth threshold value, the re-sampler control unit RCTLU quits the normal mode and switches back to the search mode. In this case the last 'good' sampling frequency can be saved and used as the sampling frequency to start with in the re-entered search mode, in order to keep the search time short in case the audio signal was interrupted for a short time only while the sampling frequency has not changed.

The storage and calculation operations are carried out in re-sampler control unit RCTRLU.

The inventive processing operates in real-time, i.e. each one of the candidate frequency scanning loops, or part of these frequencies, is carried out on a different section or frame of the incoming watermarked signal RWAS. However, it is also possible that the watermarked signal RWAS is stored as a data file on which the inventive processing is carried out.

Figure 2:
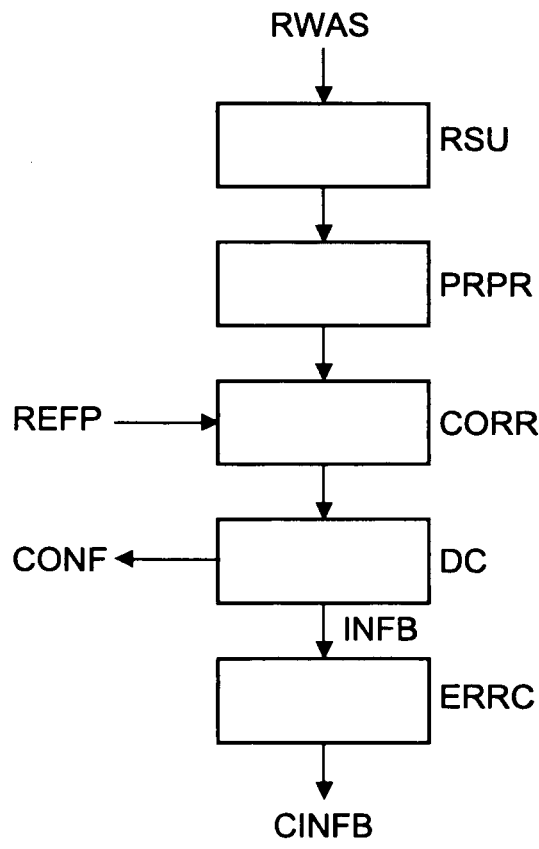
FIG. 2 more detailed block diagram of the watermark decoding.

In the watermark decoder block diagram in FIG. 2, the receiving section unit RSU represents the steps or stages of FIG. 1 except the watermark decoder or decoder function WMDF. After the incoming watermarked signal RWAS has been re-sampled in, and passed, step or unit RSU, it may pass through a pre-processing step or stage PRPR wherein a spectral shaping and/or whitening and/or inverse frequency transform can be carried out. In the following correlation step or stage CORR it is correlated section by section with one or more reference patterns REFP. A decision step or stage DC determines whether or not a correlation result peak is present (e.g. by comparing the maximum positive or negative correlation result amplitude with a suitable threshold value), and derives from the unambiguousness of that peak (i.e. how clearly it distinguishes from noise and smaller correlation result peaks) a corresponding confidence value CONF. In an optional downstream error correction step or stage ERRC the preliminarily determined watermark information bits INFB can be error corrected, resulting in corrected watermark information bits CINFB.

The invention is applicable to all technologies where a correlation may be disturbed by something similar to echoes and reverberation, for example watermarked video that has been encoded perceptually.

What is claimed, is:

1. A method for determining and using, in a watermark decoder device, a sampling frequency for decoding watermark information embedded in a received distorted watermarked audio signal sampled with a single original sampling frequency at encoder side, said method comprising:

decoding said received distorted watermarked audio signal by performing a correlation between a section or frame of said received distorted watermarked audio signal and at least one reference pattern, in order to determine from said correlation watermark information contained in said received distorted watermarked audio signal, wherein said distortion arises from reception of said received distorted watermarked signal via an acoustic path with acoustic waves, and wherein a current piece of said watermark information is assigned to a current section or frame of said received distorted watermarked audio signal;

in a search mode, for multiple successive sections or frames of said received distorted watermarked audio signal, scanning repeatedly varying candidate sampling frequencies out of a frequency range that includes said original sampling frequency, thereby preliminarily watermark decoding, using these candidate sampling frequencies, the corresponding section or frame of said received signal, wherein for each candidate sampling frequency used in said preliminarily watermark decoding a corresponding watermark information bit confidence value derived from the result of said correlation is determined and the confidence values for each one of the candidate sampling frequencies are summed up or combined over said multiple successive sections or frames so as to form corresponding confidence sum values, and wherein, as soon as the confidence sum value of a current candidate sampling frequency for said multiple successive sections or frames is equal to or greater than a first threshold value, said search mode is left and a normal mode is entered with this current candidate sampling frequency being selected;

determining a maximum and a second maximum one of the confidence sum values for said candidate sampling frequencies, wherein, as soon as their quotient or their difference exceeds a second threshold value, or in case a maximum scanning loop number is achieved, said search mode is left and said normal mode is entered whereby the candidate sampling frequency is selected that is related to said maximum confidence sum value, wherein in case said maximum scanning loop number is achieved it is calculated whether said quotient or said difference exceeds said second threshold value and if not true said search mode is continued;

in the normal mode, taking said selected candidate sampling frequency as said original sampling frequency and watermark decoding said received distorted watermarked audio signal section by section or frame by frame using said selected candidate sampling frequency.

2. The method according to claim 1, wherein in said normal mode a predetermined number of latest confidence values is continuously summed-up or combined, and the resulting sum value is compared with a third threshold value in order to recognize a change in a correct sampling frequency, and wherein, if a corresponding confidence sum value is smaller than said third threshold value, said normal mode is left and said search mode is re-entered.

3. The method according to claim 2, wherein a last sampling frequency used in said normal mode is used in said re-entered search mode as the sampling frequency to start with in said scanning.

4. The method according to claim 1, wherein in said normal mode a predefined number of adjacent candidate sampling frequencies below and above said selected sampling frequency is used for said watermark decoding in order to take into account small changes of the sampling frequency of said received distorted watermarked audio signal.

5. The method according to claim 4, wherein a spacing between the candidate frequencies can be different than in the search mode and is decreased over time.

6. The method according to claim 1, wherein a watermark information bit confidence value is high if a value of a watermark information bit is credible and is low if the value of the watermark information bit is unreliable.

7. The method according to claim 1, wherein upstream said correlation the received signal is spectrally shaped or is whitened or is inverse frequency transformed.

8. The method according to claim 1, wherein the received distorted watermarked audio signal is stored as a data file.

9. The method according to claim 8, wherein a loop of candidate frequency scanning is performed once only.

* * * * *